2,922,781
PROCESS FOR POLYMERIZING A CONJUGATED DIOLEFIN IN THE PRESENCE OF AN UNSATURATED DIMER OF ALPHAMETHYLSTYRENE

Ross G. Sowak, Sarnia, Ontario, Canada, assignor to Polymer Corporation Limited, Sarnia, Ontario, Canada, a corporation of Canada No Drawing. Application April 6, 1955
Serial No. 499,746
Claims priority, application Canada February 22, 1955
16 Claims. (Cl. 260—84.3)

This invention relates to the copolymerization of conjugated diolefins with copolymerizable materials having a single olefinic linkage. It relates more particularly to the copolymerization of butadiene-1,3 with vinyl aromatic compounds, such as styrene, and with acrylic acid derivatives, such as acrylonitrile.

It is well known that the copolymerization of these monomers may conveniently be carried out in an aqueous emulsion containing, in addition to a suitable emulsifier, a modifier, an initiator and an activator.

The modifier was added to regulate the length of the polymer chains, and to prevent branching and crosslinking which would render the polymer insoluble. Materials which have been used as modifiers in the past are certain sulfur compounds such as alkyl mercaptans, carbon disulfides, alkyl polysulfides and dialkyl xanthogen disulfides. It has been found, however, when these sulfur compounds have been used as modifiers, that the maximum conversion to polymers has been only 65% to 75%, before the modifier has been used up. It was then necessary to stop the reaction in order to prevent formation of cross-linked insoluble polymers.

It has been suggested to overcome this fault by using greater amounts of modifier. Although the percentage conversion was increased somewhat, it was found that the polymer contained large amounts of low molecular weight material formed in the early stages of the polymerization, and so has inferior properties.

It has also been suggested to add additional modifier when the conversion reaches between 65% and 75%. However, this also results in a heterogeneous polymer of inferior properties and has not come into wide use.

It is an object of the present invention to increase the percentage conversion of polymerizable compounds to polymers without increasing the amount of insoluble polymer formed and without obtaining excessive quantities of low molecular weight material.

It is a further object of the present invention to produce polymers which either do not contain mercaptan groups or contain a reduced amount of mercaptan groups as compared with the prior art.

According to the present invention, these objects are achieved by using, as the modifier or as part of the modifier, an unsaturated dimer of α-methylstyrene.

The conjugated diolefins which may be used in the practice of the invention are those containing from 4 to 12 carbon atoms, such as butadiene-1,3, chloro-2-butadiene-1,3, methyl-2-butadiene-1,3, 2,3-dimethyl butadiene-1,3, pentadiene-1,3 and the like. Examples of the co-monomers which may be used are vinyl aromatic compounds such as styrene, parachlorostyrene and dichlorostyrene and acrylic acid and its derivatives such as methyl acrylate, methyl methacrylate, and acrylonitrile.

The emulsifiers which have been used in the past and are suitable for use in the present invention include soaps of higher fatty acids such as sodium stearate, water soluble salts of high molecular weight alkyl and aralkyl sulfonic acids such as sodium isopropylnaphthalene sulfonate, and salts of high molecular weight sulfated amides and alcohols.

The initiators and activators which may be used in this invention include potassium persulfate, and the so-called "redox activators" whose main ingredients are an oxidizing agent, a reducing agent, and an oxidation catalyst. Examples of oxidizing agents are organic peroxides such as cumene hydroperoxide, diisopropylbenzene hydroperoxide and p-menthane hydroperoxide. Examples of reducing agents are reducing sugars and sodium formaldehyde sulfoxylate. The oxidation catalyst is selected from a compound of a metal which can change its valence state reversibly. Examples of such metals are iron, manganese and copper.

In some polymerization recipes mercaptan performs the dual functions of promoting and modifying. For example, in the emulsion copolymerization of butadiene-1,3 and styrene at 50° C. using potassium persulfate as the catalyst, little or no polymerization takes place in the absence of mercaptan. On the other hand, when butadiene-1,3 and acrylonitrile are copolymerized in this recipe, polymerization proceeds readily in the absence of mercaptan. It is possible to use other compounds as promoters. For example, acrylonitrile will act as the promoter in the copolymerization of butadiene-1,3 and styrene. It is not believed that the unsaturated dimer of α-methylstyrene will act as a promoter, so that the present invention may use, in addition to the said dimer, some mercaptan or other material as a promoter. It is also well known that only a very small amount of promoter is required, 0.01 to 0.02 part of mercaptan per 100 parts by weight of total polymerizable compounds being sufficient. We have found in the practice of this invention that satisfactory promoting of (butadiene-1,3)-styrene copolymerization with acrylonitrile is achieved with 0.1 to 0.2 part of the latter. In the production of a copolymer of (butadiene-1,3)-styrene and acrylonitrile the acrylonitrile performs the function of a promoter as well as being a comonomer. It should be borne in mind, when mercaptan is used as a promoter, that some of the mercaptan may incidentally be used up as a modifier.

It has been found that from 0.5 to 10 parts of the dimer per 100 parts by weight of total compounds being polymerized may be used as a modifier. In practice, it is preferred to use from 1 to 5 parts of said dimer per 100 parts by weight of total compounds being polymerized. However, for special recipes, such as those used in the production of very low molecular weight polymer, it is desirable to use up to 20 parts of said dimer. The use of the dimer in production of polymers in which a great deal of modification is required, such as liquid polymers, is superior to the use of mercaptans which contribute an objectionable odour to the final product.

The α-methylstyrene dimer, as manufactured, is a mixture of 4-methyl-2,4-diphenylpentene-1 and 4-methyl-2,4-diphenylpentene-2. Since it is difficult to prepare each isomer free of the other, the α-methylstyrene used in the present examples was a mixture of the two isomers and had the following physical properties:

Specific gravity (at 25°/25° C.) _____ 0.988
Refractive index (D/25° C.) _____ 1.5668
Boiling point range at 20 mm. mercury, ° C. __ 183.5–189

The following examples are given to illustrate the invention.

EXAMPLE I

The following polymerization recipe was used. Figures are in parts by weight.

Butadiene-1,3 _____ 71
Styrene _____ 29
Water _____ 180
Emulsifier (sodium stearate) _____ 4
Potassium persulfate _____ 0.3
Dodecyl mercaptan _____ 0.42
α-Methylstyrene dimer _____ 1.0

The reaction proceeded at a controlled temperature of 50° C., and samples were taken at various intervals during the reaction. On each of these samples the percentage conversion, intrinsic viscosity and percent insoluble in benzene was determined. The intrinsic viscosity determinations were carried out at 30° C. using a mixed solvent containing 80 parts by volume of toluene and 20 parts by volume of isopropyl alcohol. These values are shown in Table I.

Table I

| percent conversion | intrinsic viscosity | percent insoluble polymer |
|---|---|---|
| 13.2 | 0.81 | 0.0 |
| 21.6 | 0.54 | 0.0 |
| 29.8 | 0.78 | 0.0 |
| 37.3 | 0.91 | 0.0 |
| 60.6 | 1.14 | 0.0 |
| 66.2 | 1.20 | 0.0 |
| 84.3 | 1.65 | 0.0 |
| 85.2 | 1.81 | 0.0 |

It is known that an increase in intrinsic viscosity with increase in percentage conversion indicates an increase in the average molecular weight, while a decrease in the intrinsic viscosity with increase in percentage conversion indicates the presence of appreciable amounts of branching and cross-linked polymers insoluble in benzene. The results as shown in Table I indicate that even at 85.2 percent conversion there is no insoluble polymer formed. This conversion was achieved in 20 hours.

EXAMPLE II

The polymerization as in Example I was repeated except 0.13 part dodecyl mercaptan and 1.2 parts of α-methylstyrene dimer were used. The reaction was carried out at 50° C. and reached a conversion of 85.9% in 20 hours. The results are recorded in Table II.

Table II

| percent conversion | intrinsic viscosity | percent insoluble polymer |
|---|---|---|
| 9.8 | 1.55 | 0.0 |
| 20.9 | 1.91 | 0.0 |
| 29.5 | 2.61 | 0.0 |
| 39.7 | 3.30 | 0.0 |
| 50.7 | 3.42 | 0.0 |
| 73.0 | 3.86 | 0.0 |
| 77.4 | 2.75 | 43.4 |
| 85.9 | 2.16 | 61.7 |

These results show that a 73% conversion to polymers of exceptionally high molecular weight is achieved without the formation of any insoluble polymer.

EXAMPLES III AND IV

The following polymerization recipe was used in these examples, the figures being given in parts by weight:

| | |
|---|---|
| Butadiene-1,3 | 71.0 |
| Styrene | 29.0 |
| FeSO$_4$.7H$_2$O | 0.005 |
| Sodium formaldehyde sulfoxylate | 0.0286 |
| Ethylenedinitrilotetraacetic acid | 0.0058 |
| Diisopropylbenzene hydroperoxide | 0.0625 |
| α-Methylstyrene dimer | 0.50 |
| Dresinate 214 | 4.7 |
| Daxad 11 | 0.10 |
| KCl | 0.50 |
| Water | 200.0 |

Dresinate 214 is the potassium base rosin soap manufactured by the Hercules Powder Co., Wilmington, Delaware.

Daxad 11 is the sodium salt of a naphthalene sulfonic acid condensed with formaldehyde manufactured by the Dewey and Almy Chemical Co., Cambridge, Mass.

In addition, the recipe of Example III also contained 0.24 part dodecyl mercaptan.

At a reaction temperature of 13° C., Example III gave a percentage conversion of 62, while Example IV gave a percentage conversion of 17. This indicates that without a small amount of dodecyl mercaptan promoter the reaction rate is extremely slow.

EXAMPLES V TO VII

The following polymerization recipe is used in Examples V and VI, with the figures given in parts by weight:

| | |
|---|---|
| Butadiene-1,3 | 71 |
| Styrene | 29 |
| Potassium persulfate | 0.30 |
| α-Methylstyrene dimer | 0.50 |
| Sodium stearate | 4.0 |
| Water | 180.0 |

In addition, Example V has 0.48 part by weight of dodecyl mercaptan. Example VII uses the same amounts of butadiene-1,3, styrene, and potassium persulfate, but uses 0.05 part dodecyl mercaptan and 0.38 part of α-methylstyrene dimer. The results are given in Table III.

Table III

| Example No. | Reaction Temperature, ° C. | Reaction Time (hours) | Percent Conversion |
|---|---|---|---|
| V | 50 | 16 | 86 |
| VI | 50 | 16 | 0.0 |
| VII | 50 | 16 | 84 |

These results indicate that even as small an amount as 0.05 part dodecyl mercaptan promoter when used with α-methylstyrene dimer, according to the present invention, results in a very high conversion rate. Also evident is the very great decrease in the conversion rate when no mercaptan promoter is used.

EXAMPLE VIII

The following polymerization recipe was used in Example VIII with the figures given in parts by weight:

| | |
|---|---|
| Butadiene-1,3 | 71.0 |
| Styrene | 29.0 |
| Water | 200.0 |
| Potassium persulfate | 0.30 |
| Dodecyl mercaptan | 0.10 |
| Sodium stearate | 4.0 |
| α-Methylstyrene dimer | 10.0 |

The polymerization reaction was carried on at 50° C. for 34 hours at which time 74.4% of the monomers had been converted to polymer. During the course of the polymerization samples were taken for intrinsic viscosity measurement. These results are shown in Table IV.

Table IV

| Reaction Time (hrs.) | Percent Conversion | Intrinsic Viscosity |
|---|---|---|
| 4 | 16.8 | 1.46 |
| 11 | 30.7 | 1.53 |
| 20 | 55.0 | 2.34 |
| 24 | 59.9 | 2.51 |
| 30 | 69.2 | 2.69 |
| 34 | 74.4 | 2.88 |

The results show that the use of 10 parts dimer gives a soluble polymer of fairly high molecular weight in a reasonable reaction time.

EXAMPLE IX

The following polymerization recipe was used with the figures given being in parts by weight:

| | |
|---|---|
| Butadiene-1,3 | 72.0 |
| Styrene | 28.0 |
| Acrylonitrile | 0.25 |
| Water | 250.0 |
| Nacconol NRSF | 10.0 |
| Daxad 11 | 3.0 |
| Trisodium phosphate | 0.15 |
| Potassium persulfate | 0.30 |
| α-Methylstyrene dimer | 10.0 |

Nacconol NRSF is the sodium alkyl aryl sulfonate manufactured by the National Aniline Division, Allied Chemical and Dye Corp., New York, N.Y.

Polymerization was carried out at 50° C. and achieved a conversion of 86.2% in 46 hours. The relationship between percent conversion and intrinsic viscosity is shown in Table V.

Table V

| Percent Conversion | Intrinsic Viscosity |
|---|---|
| 28.5 | 1.84 |
| 48.2 | 2.33 |
| 69.3 | 2.16 |
| 73.4 | 1.98 |

These data show that a small amount of acrylonitrile can be used as promoter in place of mercaptan. The combination of 0.25 part of acrylonitrile and 10 parts α-methylstyrene dimer resulted in a peak viscosity at about 60% conversion. Solubility measurements showed that below this conversion the polymer was completely soluble.

EXAMPLES X TO XIII

The following polymerization recipe is used in Examples X to XIII with the figures given in parts by weight. Polymerizations were carried out at 50° C.

| | |
|---|---|
| Butadiene | 55.0 |
| Acrylonitrile | 45.0 |
| Water | 250.0 |
| Daxad 11 | 2.0 |
| Dodecyl amine | 0.15 |
| Potassium persulfate | 0.20 |

In addition, Example X had 1.0 part of dodecyl mercaptan and 0.5 part of α-methylstyrene dimer. Example XI had 1.0 part of dodecyl mercaptan and 1.0 part of dimer. Example XII had 0.5 part of dimer. Example XIII had 1.0 part of dimer. The intrinsic viscosity of the polymer was determined at 30° C. in a mixture of toluene and methyl ethyl ketone (55/45 by volume). The solubility of the polymer was determined in methyl ethyl ketone. The results are given in Table VI.

Table VI

| Example No. | Percent Conversion in 16 Hrs. | Intrinsic Viscosity | Percent Insoluble Polymer |
|---|---|---|---|
| X | 38.2 | 3.18 | Nil. |
| XI | 35.4 | 2.72 | Nil. |
| XII | 24.0 | 2.74 | Nil. |
| XIII | 18.1 | 2.19 | Nil. |

The results show that the polymer is modified by α-methylstyrene dimer and that polymerization will proceed in the absence of mercaptan. The polymerization rate is fairly slow but this can be overcome by a change in the emulsifier system.

EXAMPLES XIV AND XV

Butadiene-1,3 and acrylonitrile were copolymerized using the following recipe in which the figures given are in parts by weight. The reaction was carried out at 60° C.

| | |
|---|---|
| Butadiene-1,3 | 55.0 |
| Acrylonitrile | 45.0 |
| Water | 250.0 |
| Nacconol NRSF | 0.5 |
| Daxad 11 | 3.1 |
| Trisodium phosphate | 0.15 |
| Potassium persulfate | 0.20 |

Example XIV had, in addition, a charge of 1.0 part of dodecyl mercaptan and 1.0 part of α-methylstyrene dimer. In 17 hours 92% conversion was achieved.

Example XV had a charge of 1.0 part of α-methylstyrene dimer but no mercaptan. In 17 hours 94% conversion was achieved.

What I claim is:

1. In the process which comprises polymerizing a conjugated diolefinic hydrocarbon containing 4 to 12 carbon atoms in aqueous emulsion, in the presence of a polymerization catalyst selected from the group consisting of persulfate polymerization catalysts and organic peroxide polymerization catalysts, the improvement which comprises forming a high molecular weight polymer by carrying out the polymerization in the presence of 0.5 to 20 parts per 100 parts of said conjugated diolefinic hydrocarbon of an unsaturated dimer of alphamethylstyrene.

2. The process according to claim 1 in which said conjugated diolefinic hydrocarbon is butadiene-1,3.

3. In the process which comprises copolymerizing a major proportion of a conjugated diolefinic hydrocarbon containing 4 to 12 carbon atoms with a minor proportion of a copolymerizable vinyl aromatic compound in aqueous emulsion, in the presence of a polymerization catalyst selected from the group consisting of persulfate polymerization catalysts and organic peroxide polymerization catalysts, the improvement which comprises forming a high molecular weight polymer by carrying out the polymerization in the presence of 0.5 to 20 parts per 100 parts of the compounds being polymerized of an unsaturated dimer of alphamethylstyrene.

4. The process according to claim 3 in which said conjugated diolefinic hydrocarbon is butadiene-1,3.

5. The process according to claim 3 in which said vinyl aromatic compound is styrene.

6. In the process which comprises polymerizing a conjugated diolefinic hydrocarbon containing 4 to 12 carbon atoms in aqueous emulsion, in the presence of a polymerization catalyst selected from the group consisting of persulfate polymerization catalysts and organic peroxide polymerization catalysts and in the presence of an acrylonitrile polymerization promoter, the improvement which comprises forming high molecular weight polymer by carrying out the polymerization in the presence of 0.5 to 20 parts per 100 parts of said conjugated diolefinic hydrocarbon of an unsaturated dimer of alphamethylstyrene.

7. In the process which comprises polymerizing a conjugated diolefinic hydrocarbon containing 4 to 12 carbon atoms in aqueous emulsion, in the presence of a polymerization catalyst selected from the group consisting of persulfate polymerization catalysts and organic peroxide polymerization catalysts and in the presence of an aliphatic mercaptan having at least six carbon atoms in the aliphatic linkage polymerization promoter, the improvement which comprises forming high molecular weight polymer by carrying out the polymerization in the presence of 0.5 to 20 parts per 100 parts of said conjugated diolefinic hydrocarbon of an unsaturated dimer of alphamethylstyrene.

8. In the process which comprises copolymerizing a major proportion of a conjugated diolefinic hydrocarbon containing 4 to 12 carbon atoms with a minor proportion of a copolymerizable vinyl aromatic compound in aqueous emulsion, in the presence of a polymerization catalyst selected from the group consisting of persulfate polymerization catalysts and organic peroxide polymerization catalysts and in the presence of an acrylonitrile polymerization promoter, the improvement which comprises forming high molecular weight polymer by carrying out the polymerization in the presence of 0.5 to 20 parts per 100 parts of the compounds being polymerized of an unsaturated dimer of alphamethylstyrene.

9. In the process which comprises copolymerizing a major proportion of a conjugated diolefinic hydrocarbon containing 4 to 12 carbon atoms with a minor proportion of a copolymerizable vinyl aromatic compound in aqueous emulsion, in the presence of a polymerization catalyst selected from the group consisting of persulfate polymerization catalysts and organic peroxide polymerization catalysts and in the presence of an aliphatic mercaptan having at least six carbon atoms in the aliphatic linkage polymerization promoter, the improvement which comprises forming high molecular weight polymer by carrying out the polymerization in the presence of 0.5 to 20 parts per 100 parts of the compounds being polymerized of an unsaturated dimer of alphamethylstyrene.

10. The process according to claim 8 in which said diolefinic hydrocarbon is butadiene-1,3.

11. The process according to claim 9 in which said diolefinic hydrocarbon is butadiene-1,3.

12. The process according to claim 8 in which said vinyl aromatic compound is styrene.

13. The process according to claim 9 in which said vinyl aromatic compound is styrene.

14. In the process which comprises polymerizing a conjugated diolefinic hydrocarbon containing 4 to 12 carbon atoms in aqueous emulsion, in the presence of a polymerization catalyst selected from the group consisting of persulfate polymerization catalysts and organic peroxide polymerization catalysts and in the presence of about 0.05 to 0.42 part per 100 parts of diolefinic hydrocarbon of an aliphatic mercaptan having at least six carbon atoms in aliphatic linkage, the improvement which comprises forming high molecular weight polymer by carrying out the polymerization in the presence of 0.5 to 20 parts per 100 parts of said conjugated diolefinic hydrocarbon of an unsaturated dimer of alphamethylstyrene.

15. In the process which comprises copolymerizing a major proportion of a conjugated diolefinic hydrocarbon containing 4 to 12 carbon atoms with a minor proportion of a copolymerizable vinyl aromatic compound in aqueous emulsion, in the presence of a polymerization catalyst selected from the group consisting of persulfate polymerization catalysts and organic peroxide polymerization catalysts and in the presence of about 0.05 to 0.42 part per 100 parts of the compounds being polymerized of an aliphatic mercaptan having at least six carbon atoms in the aliphatic linkage, the improvement which comprises forming high molecular weight polymer by carrying out the polymerization in the presence of 0.5 to 20 parts per 100 parts of the compounds being polymerized of an unsaturated dimer of alphamethylstyrene.

16. In the process which comprises copolymerizing a major proportion of butadiene-1,3 with a minor proportion of styrene in aqueous emulsion in the presence of a polymerization catalyst selected from the group consisting of persulfate polymerization catalysts and organic peroxide polymerization catalysts and in the presence of an aliphatic mercaptan having at least six carbon atoms in aliphatic linkage, the improvement which comprises forming high molecular weight polymer by carrying out the polymerization in the presence of 0.5 to 20 parts per 100 parts of the compounds being polymerized of an unsaturated dimer of alphamethylstyrene.

References Cited in the file of this patent

UNITED STATES PATENTS

| 2,281,613 | Wolthan et al. | May 5, 1942 |
| 2,646,423 | Wehr et al. | July 21, 1953 |
| 2,646,424 | Wehr et al. | July 21, 1953 |

OTHER REFERENCES

Boundy-Boyer: "Styrene Its Polymers Copolymers and Derivatives," Reinhold Publishing Corp., New York (1952), page 814.